Jan. 26, 1971 MAKOTO SUDO ET AL 3,558,695
PROCESS FOR PREPARING METHACRYL AMIDE-METH-ACRYLIC ACID MIXTURES
Filed June 23, 1967 2 Sheets-Sheet 1

United States Patent Office 3,558,695
Patented Jan. 26, 1971

3,558,695
PROCESS FOR PREPARING METHACRYL AMIDE-METHACRYLIC ACID MIXTURES
Makoto Sudo, Tokyo, Yasumasa Yamamoto and Masao Kobayashi, Ohtake-shi, Kenichi Yamasaki, Musashino-shi, and Minoru Ikeda, Ohtake-shi, Japan, assignors to Mitsubishi Rayon Co., Ltd., Tokyo, Japan, a corporation of Japan
Filed June 23, 1967, Ser. No. 648,380
Claims priority, application Japan, June 29, 1966, 41/41,797
Int. Cl. C07c 51/08, 103/08
U.S. Cl. 260—526                                     9 Claims

ABSTRACT OF THE DISCLOSURE

A process for preparing methacrylic acid and derivatives thereof by mixing acetone cyanhydrin with concentrated sulfuric acid and then subjecting the mixture to dehydration in which the mixing and dehydration operations are effected at 2 or more stages, wherein the first stage, the mixing operation is effected using a sulfuric acid to acetone cyanhydrin molar ratio of at least 1.5:1; in the subsequent stage, the mixing operation is effected while so controlling said molar ratio as to gradually become closer to 1:1; and in the final stage, the mixing operation is effected while controlling said molar ratio to at least 1:1.

---

Figure 1:
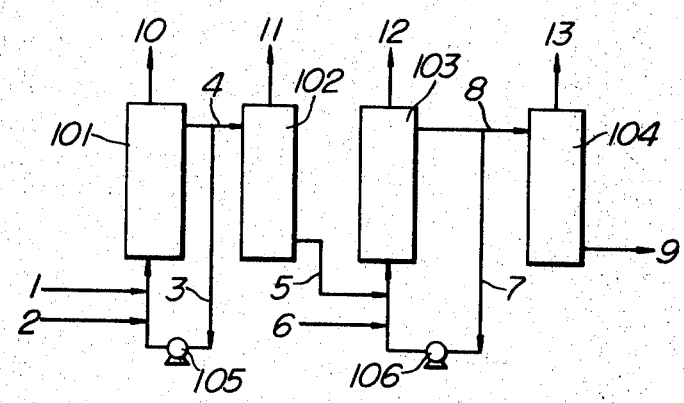
Figure 2:
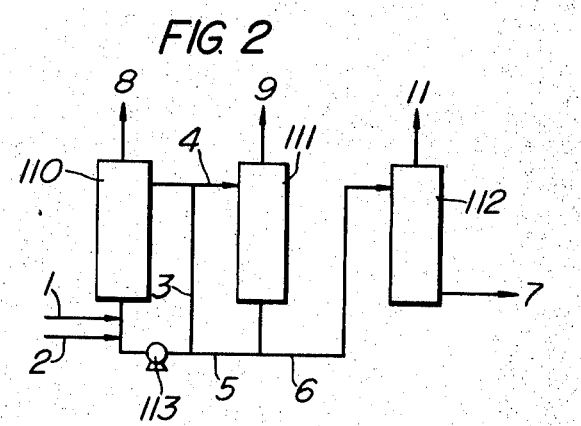
Figure 3:
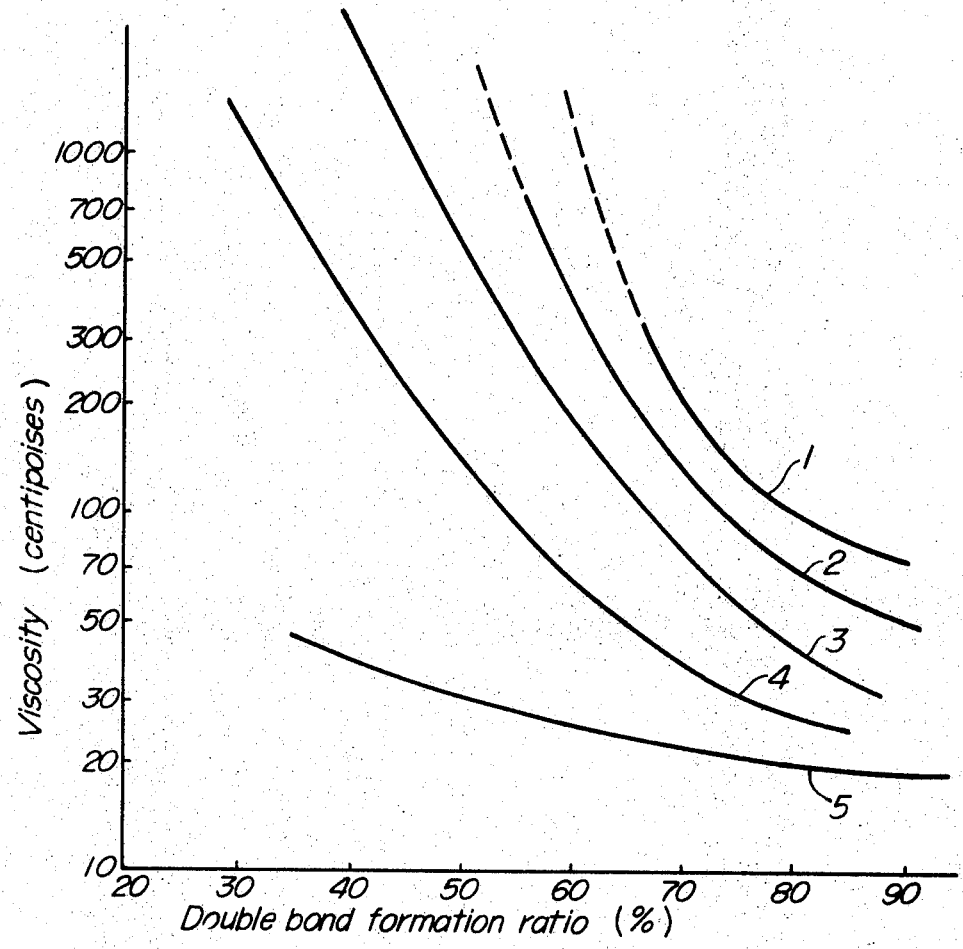

FIGS. 1 and 2 are flow sheets for illustrating the modes of practice of the present invention, and FIG. 3 is a graph showing the influence of the sulfuric acid-acetone cyanhydrin molar ratio and double bond formation ratio of a sulfuric acid-acetone cyanhydrin mixed liquid on the viscosity of said mixed liquid.

This invention relates to an improved process for preparing methacrylamide from acetone cyanhydrin and concentrated sulfuric acid in which the operations are effected smoothly and the yields of methacrylamide are increased.

The term "methacrylamide" used in this invention means a mixture of the methacrylamide and a small amount of methacrylic acid.

It is well known that methacrylic acid, alkyl methacrylates or methacrylamide can be produced from acetone cyanhydrin-sulfuric acid intermediate reaction product in the presence of alcohol or ammonia water. The steps for the production of these compounds are carried out, in general, by first mixing acetone cyanhydrin with concentrated sulfuric acid (hereinafter referred to as "the mixing operation") and then subjecting the mixed liquid to dehydration at an elevated temperature (hereinafter referred to "the dehydration operation") to form double bonds, i.e. methacrylamide and then methacrylamide is converted to methacrylic acid or alkyl methacrylates by hydrolysis or esterification.

In these mixing and dehydration operations, the smaller the proportion of sulfuric acid to acetone cyanhydrin, the more economically advantageous the production of methacrylamide. Stoichiometrically, the amount of sulfuric acid may be equimolar to acetone cyanhydrin. Actually, however, there are some cases where, unless sulfuric acid is used in large excess, the reaction liquid increases viscosity to be solidified during the mixing operation, whereby the yield of the desired product is lowered. In the mixing step, the reaction velocity of sulfuric acid with acetone cyanhydrin is quick, and a large amount of reaction heat is generated in this case. Thus, sufficient mixing should be conducted so that the temperature and concentration are quite homogeneous throughout the mixture, leaving no unhomogeneous parts. A great factor dominating the easiness of mixing of reactants is the viscosities of the liquids.

In the case of a mixed liquid of sulfuric acid and acetone cyanhydrin, the viscosity of the mixed liquid is greatly influenced by the molar ratio of the two components and the double bond formation ratio, i.e. the methacrylamide formation ratio, of the liquid. FIG. 3 is a graph indicating the abve relationship and shows the results measured at 90° C. using 98.5% sulfuric acid. In FIG. 3, the double bond formation ratios are plotted on the horizontal axis while the viscosities of mixed liquid on the vertical axis, and the curves 1, 2, 3, 4 and 5 show the cases where the sulfuric acid-acetone cyanhydrin molar ratios are 1.1:1, 1.3:1, 1.5:1, 1.7:1 and 2.0:1, respectievly. As seen in FIG. 3, the viscosity of the mixed liquid increases with decreasing excess ratio of sulfuric acid and with lowering double bond formation ratio. Further, in case the excess ratio of sulfuric acid is low, the double bond formation rate also becomes low, and this becomes a cause for further lowering the viscosity. As a means for lowering the viscosity without using a large excess of sulfuric acid, there may be thought of such a procedure that the mixing temperature is elevated. However, if the mixing temperature is elevated to above 100° C., acetone cyanhydrin undergoes decomposition to bring about the lowering of yield.

The present inventors studied processes in which the reaction could be smoothly effected at a mixing temperature of 80°–100° C. without increasing the viscosity of the mixed liquid, and, finally, the excess ratio of sulfuric acid could be lowered. As the result, the inventors have attained the present invention. That is, the present invention is a process for preparing methacrylic acids which comprises mixing acetone cyanhydrin with concentrated sulfuric acid to 80°–100° C. and subjecting the mixture to dehydration at 110° C. or above, characterized in that the mixing and dehydration operations are effected at 2 or more stages and the dehydration operation is carried out after each mixing operation, wherein at the first stage, the mixing operation is effected using sulfuric acid to an acetone cyanhydrin molar ratio of at least 1.5:1; at each of the subsequent stages, acetone cyanhydrin is added to make closer to 1:1 the molar ratio of sulfuric acid to total acetone cyanhydrin; and at the final stage, said molar ratio is controlled to 1–1.5:1 and the final dehydration operation is effected at a temperature of 130° C. or above.

In the present invention, the mixing and dehydration operations are carried out at multi-stages. At the initial stage, the mixing is effected under such condition that the sulfuric acid-acetone cyanhydrin molar ratio is high. After the dehydration operation, when the viscosity of the mixed liquid has lowered due to the formation of a methacrylamide, the mixing operation of the subsequent stage is effected, and the operations are carried out while successively adding acetone cyanhydrin. Thus, the mixing and dehydration operations can be always effected under such conditions that the viscosity of the liquid is low. Further, the sulfuric acid to acetone cyanhydrin molar ratio can finally be lowered to about 1.0. According to the persent process, not only the operations are smoothly effected but also the yields are greatly increased.

The acetone cyanhydrin employed in practicing the present invention is not required to be particularly purified. Further, the sulfuric acid concentration suitable for the object of the present invention is at least 96%, preferably at least 97.5%. If sulfuric acid at a concentration lower than 96% is used, the yield is lowered.

In practicing the present invention, the initial molar ratio of sulfuric acid to acetone cyanhydrin should be at least 1.5:1. If the molar ratio is less than 1.5, the viscosity of the reaction liquid increases, when the dehydration conversion has become high, to make the operation difficult. In some cases, the reaction liquid is solidified to make the subsequent operations impossible.

The temperature at the time of mixing is preferably 80°–100° C. If the temperature is below 80° C., a long period of time is required for the subsequent dehydration operation to bring about economical disadvantages. If the temperature is above 100° C., acetone cyanhydrin is decomposed to lower the yield.

The molar ratio of sulfuric acid to acetone cyanhydrin after the final mixing is 1–1.5:1. If the final molar ratio is more than 1.5, it cannot be said that the present process is particularly advantageous as compared with the one-stage process.

The present invention will be explained below with reference to two cases; batch-wise process and continuous process.

BATCH-WISE PROCESS

In this process, the first stage mixing is effected under such conditions as, for example, a sulfuric acid-acetone cyanhydrin molar ratio of 1.5–3.0 and a temperature of 80–100° C., so that the formation ratio of methacrylamide to fed acetone cyanhydrin becomes 10–50%. Under such mixing conditions, the reaction liquid is neither increased in viscosity nor is solidified. Subsequently, the reaction liquid is heated at 100–140° C. for a definite period so that the methacrylamide formation ratio becomes 50–95%. In this case, if the heat treatment temperature, i.e. the dehydration operation temperature, is below 100° C., the dehydration reaction time becomes excessively long, while if said temperature is above 140° C., the dehydration reaction time becomes excessively short, and disadvantages are brought about in constructing a commercial scale apparatus. Further, if the dehydration ratio is made more than 95%, the yield is undesirably lowered. To the reaction liquid, acetone cyanhydrin is further added at 80°–100° C., and the above operation is repeated. In this case, the sulfuric acid-acetone cyanhydrin molar ratio is always controlled so as to become greater than 1. Even when the sulfuric acid-acetone cyanhydrin molar ratio has become smaller than 1.5, there is observed no such phenomenon as viscosity increase or solidification. Successively, the reaction liquid is heat treated at 130°–160° C., preferably 140°–150° C. The mixing and dehydration operation can be effected not only at 2 stages but also at 3 or more stages.

CONTINUOUS PROCESS

Two main modes for continuously operating the present invention will be illustrated below with reference to the accompanying drawings. The present invention may also be practiced by suitably combining these 2 modes.

The first mode is as shown in FIG. 1. In the drawing, 101 and 103 are first and second mixers provided with heat exchangers for removing reaction heat, and 102 and 104 are dehydrators provided with heaters.

To the mixer 101 are fed through pipes 1 and 2 sulfuric acid and acetone cyanhydrin in a molar ratio of 1.5–3.0. A part of the reaction liquid, which has left the mixer 101, is recycled by means of pump 105 to the mixer 101 in order to increase the heat exchange efficiency and to thoroughly effect the mixing. The temperature of the mixer 101 is maintained at 80°–100° C. and the volume thereof is decided so that the methacrylamide formation ratio of the discharged reaction liquid becomes 10–50%. A part of the reaction liquid from the mixer is introduced through pipe 4 into the dehydrator 102, in which the formation of methacrylamide is partly effected at 100°–140° C. in a piston flow state. Thereafter, the reaction liquid is introduced through pipe 5 into the mixer 103. Through pipe 6, fresh acetone cyanhydrin is fed, and the amount thereof is controlled so that the molar ratio of sulfuric acid to total acetone cyanhydrin becomes greater than 1. A part of the reaction liquid, which has left the mixer 103, is recycled by means of pump 106 to the mixer 103, like in the case of the mixer 101. The temperature of the mixer 103 is maintained at 80°–100° C. A part of the reaction liquid from the mixer 103 is introduced through pipe 8 into the dehydrator 104, and is heated therein at 130°–160° C., preferably 140°–150° C., to give, in a piston flow state, a methacrylamide in a high yield. Gases by-produced during the reaction are discharged out of the system through pipes 10, 11, 12 and 13.

The mixing and dehydration may also be effected at more stages. In this case, it is necessary that the final molar ratio of sulfuric acid to acetone cyanhydrin be 1 or more.

The second mode of the continuous process is as shown in FIG. 2. In the drawing, 110 is a first mixer provided with a heat exchanger for cooling. 111 is a pre-dehydrator and 112 is a dehydrator, both of which are provided with heat exchangers for heating. 113 is a recycle pump serving to enhance the efficiency of the heat exchanger attached to the mixer 110 and to make the mixing better.

To the mixer 110 are fed through pipes 1 and 2 sulfuric acid and acetone cyanhydrin so that the amount of sulfuric acid becomes somewhat excess. A part of the reaction liquid, which has left the mixer 110, is recycled through pipe 3 and the other part is sent through pipe 4 to the dehydrator, in which a part of the reaction liquid is converted into a methacrylamide. A part of the liquid which has left the dehydrator 111, is recycled through pipe 5 to the mixer 110, and the other part is introduced through pipe 6 into the dehydrator 112. The amount of the recycle liquid is decided so that in the mixer 110, the methacrylamide formation ratio becomes 60–80%. The formation ratio of methacrylamide in the dehydrator 111 is decided so that the decomposition of the methacrylamide recycled through the pipe 5 gives not much influence to the final reaction result. The reaction liquid introduced through the pipe 6 into the dehydrator 112 is subjected to heat treatment whereby a methacrylamide is obtained in a high yield. Gases by-produced during the reaction are discharged out of the system through pipes 8, 9 and 11.

As the combination of the two modes shown in FIGS. 1 and 2, there may be raised, for example, such a mode that the portions arranged prior to the pipe 5 in FIG 1 are replaced by the portions prior to the pipe 6 in FIG. 2.

The following examples illustrate the invention.

EXAMPLE 1

1.3 moles of 100% sulfuric acid was incorporated with tannic acid as a polymerization inhibitor and was mixed with 0.65 mole of acetone cyanhydrin with stirring at 80° C. The mixed liquid was heated at 100° C. for 30 minutes, was then cooled to 80° C. and was further charged at said temperature with 0.35 mole of acetone cyanhydrin. In this case, no such phenomenon as deposition of crystals or solidification was observed in the mixed liquid. Subsequently, the mixed liquid was immediately heated to 150° C. to terminate the reaction.

The formation rate of methacrylamide was measured by recovering samples from the reaction liquid every given period of time and estimating the formed double bonds according to bromine addition method. The variation in yield of methacrylamide due to the lapse of time after heating the reaction liquid to 150° C. was as shown below.

| Elapsed time (min.): | Yield (percent) |
|---|---|
| 0 | 84.6 |
| 5 | 90.0 |
| 10 | 92.5 |
| 15 | 87.8 |

For comparison, 1 mole of acetone cyandrin was added at one time with stirring at 80° C. to 1.3 moles of 100% sulfuric acid, whereby the reaction liquid was gradually increased in viscosity to form white solids and, finally, the stirring of the liquid becomes impossible. In order to avoid thois, the temperature was elevated to 95° C., whereby the stirring becomes possible. However, when the reaction liquid was heated and subjected to dehydration reaction at 150° C., the maximum yield of methacrylamide was no more than 89.5% and was lower than that attained in the above-mentioned two stage process.

EXAMPLE 2

1.2 moles of 100% sulfuric acid was incorporated with 0.1% of phenothiazine as a polymerization inhibitor and was mixed with 0.70 mole of acetone cyanhydrin with stirring at 90° C. The mixed liquid was heated at 110° C. for 20 minutes, was then cooled to 90° C. and was further mixed with 0.30 mole of acetone cyanhydrin. This mixed liquid was immediately heated to 150° C. to terminate the reaction. In this reaction, the yield of methacrylamide was measured every definite period of time in the same manner as in Example 1 to obtain the results as shown below.

| Elapsed time (min.): | Yield (percent) |
|---|---|
| 5 | 87.3 |
| 10 | 89.8 |
| 15 | 90.3 |
| 30 | 89.0 |

For comparison, 1 mole of acetone cyanhydrin was added at one time with stirring at 90° C. to 1.2 moles of 100° sulfuric acid, whereby the reaction liquid was gradually increased in viscosity to form white solids.

EXAMPLE 3

This exmaple was effected according to the mode shown in FIG. 1.

Into the first mixer 101 provided with a stirring means, sulfuric acid and acetone cyanhydrin were introduced through the pipes 1 and 2 so that the sulfuric acid to acetone cyanhudrin became 2.0. The mixing temperature was maintained at 90° C. by cooling or heating the mixer 101 with cold or hot water. After a staying time of 15 minutes, the mixed liquid was introduced through the pipe 4 into the first heater 102, was heated at 115° C. for 15 minutes and was then passed through the pipe 5 to the second mixer 103. In the second mixer, the liquid temperature was maintained at 90° C., like in the mixer 101. Through the pipe 6, acetone cyanhydrin was introduced into the mixer 103 at such a flow rate that the molar ratio of sulfuric acid to total acetone cyanhydrin was lowered to 1.3, and the mixed liquid was stayed therein for a staying time of 14 minutes. The mixed liquid was then passed through the pipe 8 to the heater 104 and was heated at 140° C. for 15 minutes. Thereafter, a mixture of sulfuric acid and methacrylamide was continuously withdrawn through the pipe 9. The yield of the methacrylamide was measured according to bromine addition method to obtain a value of 92.5% based on the acetone cyanhydrin.

Exhaust gases, such as carbon monoxide or the like, which are by-products in the mixing and heating steps, are discharged out of the system through the discharge pipes 10, 11, 12 and 13. When it was assumed that one mole carbon monoxide had been by produced from one mole acetone cyanhydrin, and all exhaust gases are carbon monoxide, the total amount of carbon monoxide corresponded to 2.5% based on the fed acetone cyanhydrin.

In contrast thereto, when, according to the continuous one-stage process, concentrated sulfuric acid and acetone cyanhydrin were mixed in such a molar ratio as 1.3 in the mixer at 90° C. for a staying time of 15 minutes, the viscosity of the mixed liquid immediately increased and the mixture was solidified to make it impossible to continue the reaction.

EXAMPLE 4

In the same continuous two-stage reaction as in Example 3, the sulfuric acid-acetone cyanhydrin molar ratio at each stage was varied to obtain the results as shown in the following table:

| Concentrated sulfuric acid-acetone cyanhydrin molar ratio | | Yield of methacrylamide (percent) |
|---|---|---|
| Value after mixing | Final value | |
| 1.66 | 1.09 | 89.1 |
| 2.00 | 1.09 | 88.8 |
| 2.00 | 1.50 | 92.5 |
| 2.00 | 1.20 | 90.0 |
| 2.70 | 1.30 | 93.0 |

In contrast thereto, when the mixing was effected according to the continuous one-stage process, while controlling the concentrated sulfuric acid-acetone cyanhydrin molar ratio to each of the final values shown in the above table, the mixture was immediately solidified to make it impossible to continue the reaction.

EXAMPLE 5

As an embodiment of the multi-stage process, a 3-stage continuous process was adopted in this example. The flow sheet of the 3-stage process was such that, to the flow sheet shown in FIG. 1, another stage of mixing and dehydration steps had been added. At the first stage, the molar ratio of sulfuric acid to acetone cyanhydrin was controlled to 1.9 and the mixing was effected at 80° C. for a staying time of 9 minutes. The mixture was passed through a heater at 110° C. for a staying time of 10 minutes and was partly dehydrated. At the second stage, only acetone cyanhydrin was added so that the sulfuric acid-total acetone cyanhydrin molar ratio became 1.3 and the mixing was effected at 90° C. for a staying time of 6 minutes. Subsequently, the mixture was passed through a heater at 115° C. for a staying time of 8 minutes and was partly dehydrated. At the third stage also, only acetone cyanhydrin was added so that the final molar ratio became 1.04, and the mixing was effected at 90° C. for a staying time of 5 minutes. The mixture was then passed through a heater at 155° C. for a staying time of 10 minutes and was dehydrated, whereby the yield of the resulting methacrylamide reached 89% based on the total acetone cyanhydrin. When it was assumed that one mole carbon monoxide had been by-produced from one mole acetone cyanhydrin, the total amount of by-produced carbon monoxide and other gases corresponded to 5% of the total amount of the fed acetone cyanhydrin.

What is claimed is:

1. A process for preparing a mixture of methacrylamide and methacrylic acid which comprises mixing one mole of acetone cyanhydrin with at least 1.5 moles of concentrated sulfuric acid at 80°–100° C. and subjecting the mixture to dehydration at above 100° C., characterized in that the mixing and dehydration operations are effected in at least 2 stages, and at the final stage the acetone cyanhydrin-sulfuric acid ratio is controlled to 1:1–1.5.

2. A process according to claim 1, wherein the concentrated sulfuric acid used has a concentration of at least 96%.

3. A process according to claim 1, wherein after the first stage, at each of the subsequent mixing stages, fresh acetone cyanhydrin is added gradually to make said molar ratio closer to 1:1.

4. A process according to claim 3, wherein the sulfuric acid employed has a concentration of at least 97.5%.

5. A process according to claim 1, wherein the first dehydration operation is effected at 100°–140° C., and the subsequent dehydration operations are effected at 130°–160° C.

6. A process for preparing a mixture of methacrylamide and methacrylic acid which comprises mixing acetone cyanhydrin with concentrated sulfuric acid at 80°–100° C., and subjecting the mixture to dehydration at above 100° C. characterized in that the mixing-dehydration operations are effected in at least 2 stages and a dehydration operation is carried out after each mixing operation, wherein at the first stage, the mixing operation is effected using an acetone cyanhydrin-sulfuric acid molar ratio of at least 1:1.5, and the dehydration operation is carried out at 100°–140° C. so as to attain a methacrylamide formation ratio of 50–95%; at each of the subsequent mixing stages, fresh acetone cyanhydrin is added gradually to make said molar ratio closer to 1:1, and the dehydration operation is effected at 130°–160° C.; and at the final mixing stage, said molar ratio is controlled to 1:1–1.5.

7. A process according to claim 6, wherein all the operations are effected in a continuous manner.

8. A process according to claim 6, wherein the mixing and dehydration operations are effected in 2 stages and in the first stage, the mixing operation is effected using an acetone cyanhydrin-sulfuric acid molar ratio of at least 1:1.7–2.5, the dehydration operation is effected so as to attain a methacrylamide formation ratio of 75–95%, and the reaction mixture is cooled to 80°–100° C.; and in the second stage, said molar ratio is controlled to 1:1.1–1.5.

9. A process according to claim 6 wherein the mixing-dehydration operations are effected in 3 stages and in the first stage, the mixing operation is effected using an acetone cyanhydrin to sulfuric acid molar ratio of 1:1.7–3.0, the dehydration operation is effected and the reaction mixture is cooled to 80°–100° C.; in the second stage, said molar ratio is controlled to 1:1.1–1.7, the dehydration operation is effected and the reaction mixture is cooled to 80°–100° C.; and in the third stage, said molar ratio is controlled to 1:1.0–1.4, and the dehydration operation is effected at 140°–160° C.

References Cited

UNITED STATES PATENTS 3,002,023   9/1961   Fikentscher et al. ____ 260—561
3,027,328   3/1962   Huter _____ 252—188.3

JAMES A. PATTEN, Primary Examiner

U.S. Cl. X.R.

260—561